United States Patent [19]

Kosuge et al.

[11] Patent Number: 5,567,005
[45] Date of Patent: Oct. 22, 1996

[54] CAR BODY WORK SUB-FRAME MOUNTING STRUCTURE

[75] Inventors: Masami Kosuge; Satoshi Takemoto; Masami Suzuki, all of Saitama-ken, Japan

[73] Assignee: Honda Giken Kogyo Kabushiki Kaisha, Tokyo, Japan

[21] Appl. No.: 396,152

[22] Filed: Feb. 28, 1995

[30] Foreign Application Priority Data

Mar. 18, 1994 [JP] Japan .................................. 6-048676

[51] Int. Cl.⁶ ................................................ B62D 25/20
[52] U.S. Cl. .............................. 296/204; 296/209; 296/30
[58] Field of Search ............................... 296/29, 30, 194, 296/204, 209; 280/781, 785

[56] References Cited

U.S. PATENT DOCUMENTS

| | | | |
|---|---|---|---|
| 2,021,780 | 11/1935 | Harmon | 280/781 |
| 4,793,629 | 12/1988 | Konig et al. | 280/781 X |
| 4,822,096 | 4/1989 | Fujii | 280/781 X |

FOREIGN PATENT DOCUMENTS

| | | | |
|---|---|---|---|
| 1455813 | 5/1969 | Germany | 296/204 |
| 4212180 | 9/1993 | Germany | 280/785 |
| 4092770 | 3/1992 | Japan | 280/781 |
| 169379 | 6/1992 | Japan | 280/781 |
| 5077763 | 3/1993 | Japan | 280/781 |
| 5077764 | 3/1993 | Japan | 280/781 |
| 5-62383 | 8/1993 | Japan . | |
| 6048316 | 2/1994 | Japan | 280/781 |
| 6099845 | 4/1994 | Japan | 280/781 |
| 6127435 | 5/1994 | Japan | 296/204 |
| 6171553 | 6/1994 | Japan | 296/195 |
| 569277 | 6/1990 | U.S.S.R. | 280/785 |

*Primary Examiner*—Dennis H. Pedder
*Attorney, Agent, or Firm*—Armstrong, Westerman, Hattori, McLeland & Naughton

[57] ABSTRACT

A car frame consisting of right and left side members which are disposed in a longitudinal direction of a car body work and a cross member which is spanned between the side members in a breadth direction of the body work; and a bracket secured to the joint sections of the side members and the cross member. The bracket is connected to the side members and the cross member, and a sub-frame, to which suspensions and others are fitted, is connected to the bracket. A fitting position of the sub-frame is arbitrarily selected for securing the suspensions. Therefore, the position of a nut member for supporting the sub-frame by a rear frame including the cross member can be adjusted and changed. As a result, when different models are produced using the same car body frame, the positions of the suspensions can be changed easily, the same frame can be used for different models, and different types of suspensions can be used while using the same frame.

21 Claims, 7 Drawing Sheets

CAR BODY WORK SUB-FRAME MOUNTING STRUCTURE

BACKGROUND OF THE INVENTION

1. Field of the Invention

This invention relates to a car body work sub-frame mounting structure.

2. Description of the Related Art

A technology, which mounts a sub-frame between side members which are longitudinally disposed on both sides of a car body work and secures suspensions to the sub-frame, is disclosed in for example Japanese Unexamined Utility Model Publication No. 5-62383. The above technology relates to a suspension member securing structure; and disposes side frames longitudinally on both sides of a car body work and protrudes vertical two-staged box-shaped brackets from the bottom faces of the side frames as illustrated in FIG. 2. Then, a cylindrical nut member is vertically inserted through the brackets, and a suspension member (corresponding to the sub-frame) is secured to the cylindrical nut member with a bolt.

In the above technology, a distance between the side frames is determined according to a car body width, so that the positions of the suspension members to be secured to the side frames are limited, eliminating flexibility of the positions to secure the suspension members.

As a sub-frame mounting structure, there is an example as shown in FIG. 10. FIG. 10 is a perspective view of the essential part of a conventional body work lower structure. A cross member 102 is mounted between side members 101 (the drawing shows only one, and the other one is omitted) and a sub-frame (not shown) is secured to the cross member 102. The side member 101 and the cross member 102 have a floor panel 103 fixed thereto to form a rectangular cross section.

Meanwhile, a great load of wheels is applied to the sub-frame through the suspensions. This requires to enhance rigidity of the sub-frame mounting sections and the joint section of the side member 101 and the cross member 102.

SUMMARY OF THE INVENTION

This invention relates to a car frame consisting of right and left side members which are disposed in a longitudinal direction of a body work and a cross member which is mounted between the side members in a breadth direction of the body work; and a bracket is fixed to the joint sections of the side members and the cross member. A nut member for fixing and supporting a sub-frame, to which suspensions and others are fitted, is vertically inserted through and connected to at least one of the bracket and the cross member, the bracket and the side member, or the bracket of a floor panel disposed thereon. And, this invention relates to a car body work sub-frame mounting structure for forming a box-shaped structure by all or parts of the above side frames, brackets, cross members and floor panel.

According to the above structure, this invention can arbitrarily select a mounting position of the sub-frame for securing the suspensions. More specifically, the position of the nut member which supports the sub-frame by a rear frame including the cross member can be adjusted and changed, being very flexible. As a result, when different models are produced using the same car body frame, the positions of the suspensions and others can be changed easily, the same frame can be used for different models, and different types of suspensions can be used while using the same frame. A single bracket is fixed to the side frames and the cross member; the cross member; or the side members, the cross member and the floor panel; and the nut member is vertically inserted to connect them, so that the car sub-frame mounting structure can be produced easily, the car frame structure can be simplified, and the number of parts can be reduced. And, since the above component members can form an effective box-shaped structure, a car frame excelling in rigidity and strength can be produced in a sample structure by a small number of components.

DETAILED DESCRIPTION OF THE INVENTION

Preferable embodiments of the invention will be described in detail with reference to the attached drawings.

In the embodiments, the expressions "front", "back", "left", and "right" indicate the directions seen from the driver's seat.

First, the first embodiment of a sub-frame mounting structure of this invention will be described with reference to FIG. 1 to FIG. 5.

Figure 1:
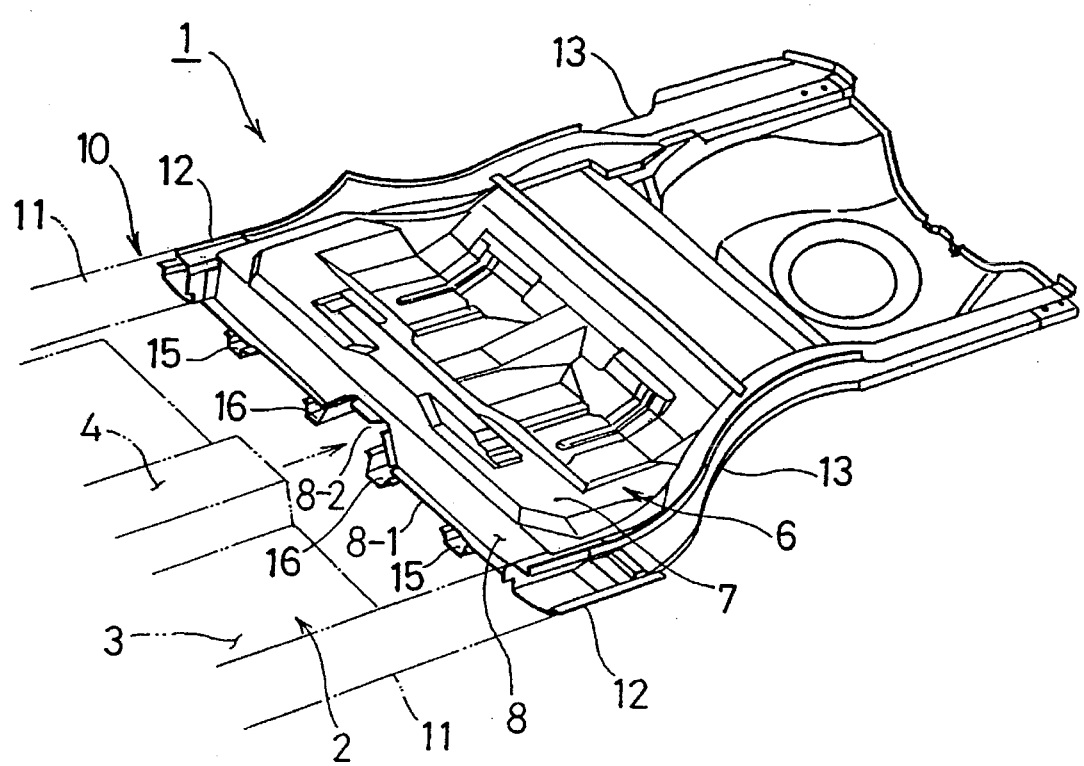
FIG. 1 is an explanatory perspective view of a car body lower structure including a sub-frame mounting structure according to a first embodiment of the invention.

FIG. 1 is an explanatory perspective view of a car body lower structure including a sub-frame mounting structure according to the invention. A car body lower structure 1 consists of a front floor panel 2 disposed at the forward part, a rear floor panel 6 disposed at the backward part and a level higher than the front floor panel, and a rear base frame 10 disposed lower than the floor panel 6. The front floor panel 2 consists of a floor 3 and a tunnel 4 disposed at the middle in the right and left directions. The rear floor panel 6 consists of a floor 7 and a front wall 8 which is formed by bending down the front end of the floor 7. The front wall 8 consists of a bottom flange 8-1 which is connected to the back end of the front floor panel 2, and an opening 8-2 which is formed to be connected to the tunnel 4.

Figure 2:
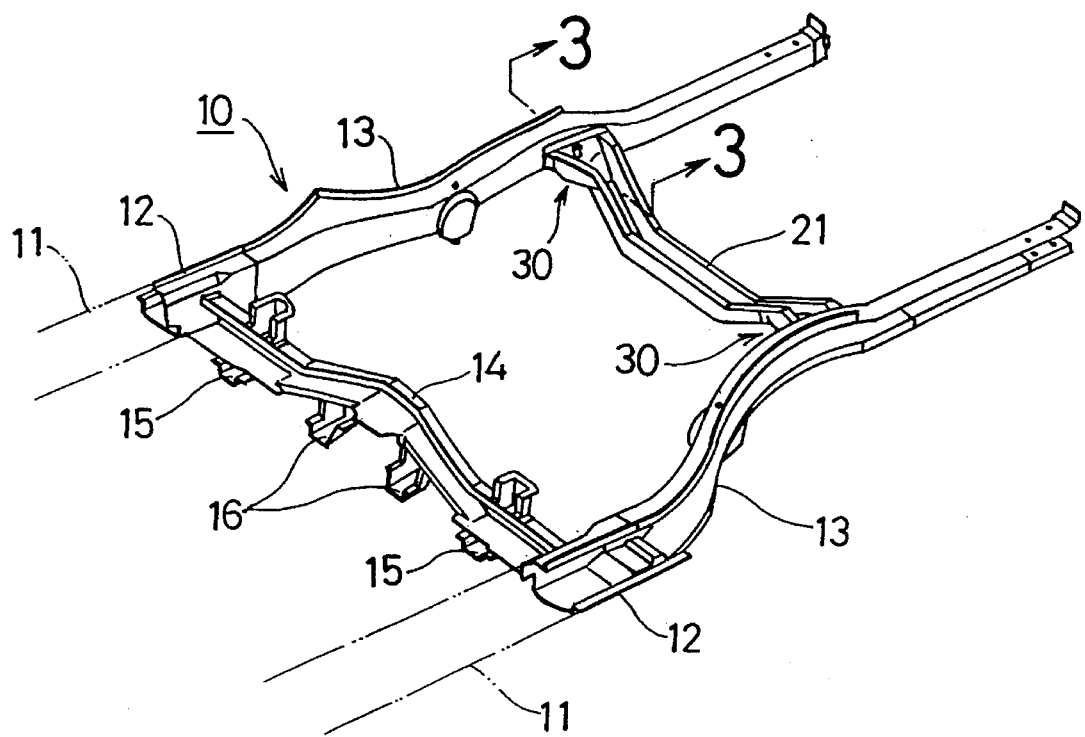
FIG. 2 is an explanatory perspective view of a rear base frame.

FIG. 2 is a perspective view of the rear frame base 10 shown in FIG. 1. The rear base frame 10 includes side sills 11, 11 which are disposed on right and left sides and extended in the front and back directions, and side sill extensions 12, 12 which are disposed at the back ends of the sidesills 11, 11. The side sill extensions 12, 12 have at their rears connected rear frames 13, 13 so as to be extended backward. A middle floor cross member 14 is mounted and connected between the side sill extensions 12, 12. A cross member 21 is mounted and connected between and at the rear parts of the rear frames 13, 13. And the cross member 21 is provided at its both ends with sub-frame mounting parts 30, 30 which are attached to the rear frames 13, 13.

The middle floor cross member 14 has an upwardly curved shape to detour the tunnel 4 (see FIG. 1) of the front floor panel 2, and is provided on its bottom face with joint members 15, 15, and 16, 16 for connecting a front floor frame (not shown) which is fixed to the bottom face of the front floor panel 2.

Figure 3:
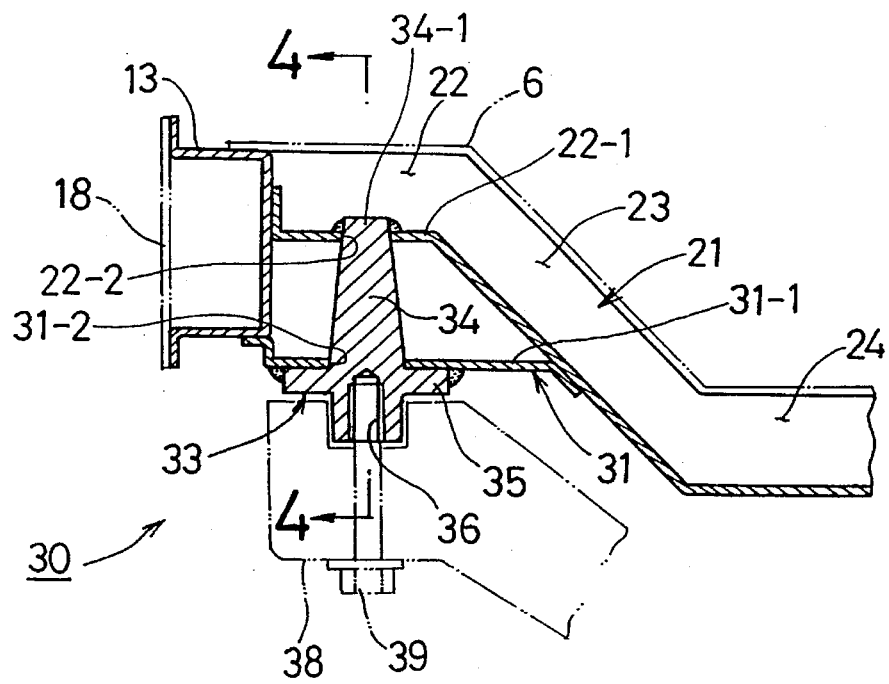
FIG. 3 is an enlarged sectional view taken along line 3—3 of FIG. 2.

FIG. 3 is an enlarged sectional view taken along line 3—3 of FIG. 2, showing the details of the sub-frame attaching part 30. The sub-frame attaching part 30 is provided with the rear frame 13, the rear cross member 21, and the rear floor panel 6 (indicated by a chain line) placed on and connected to the rear frames 13, 13 and the rear cross member 21. It is also provided with a bracket 31 which is disposed on the inner lower part of the rear frame 13 and on the bottom face and near the end of the rear cross member 21, and a nut member 33 which is connected and arranged so as to be inserted through the bracket 31 and the end of the rear cross member 21.

The rear frame 13 has a square C-shaped cross section whose open side faces the outside (an outwardly open channel shape). The open side is opposed to the outside of the body work, and an outside panel 18 is connected to the open end of the rear frame 13 to form a box shape having a nearly rectangular, enclosed, cross section. The cross member 21 consists of an upper horizontal section 22 which is connected to the middle upper part of the rear frame 13, an inclined section 23 which is obliquely extended downward and inward, and a lower horizontal section 24 which is extended inward from the bottom end of the inclined section 23.

The bracket 31 is spot-welded to the bottom face of the rear frame 13 and the bottom face of the inclined section 23 of the rear cross member 21, thereby fixing the rear frame 13 and the inclined section 23 to the lower part of the upper horizontal section 22.

A bottom plate 22-1 of the upper horizontal section 22 and a bottom plate 31-1 of the bracket 31 are arranged vertically apart, horizontal, parallel and opposed to each other.

The nut member 33 is inserted through to fix the upper horizontal section 22 and the bracket 31 in the vertical direction of the body work. The nut member 33 has an upper cylindrical base 34, and a top end 34-1 passes through the bottom plate 22-1 of the upper horizontal section 22 to fix the bottom plate 22-1 by welding or another way. The cylindrical base 34 has a flange integrally formed at its bottom end, and the flange is fixed to the bottom face of the bottom plate 31-1 of the bracket 31 by welding or the like, The nut member 33 has a screw hole 36 formed axially open downward at its center bottom face. And, the end of a sub-frame 38 which is disposed along the cross member 21 is fixed to the bottom side of the cross member 21 by screwing a bolt 39 into the screw hole 36 of the nut member 33. The sub-frame 38 is illustrated by a chain line. Suspensions and others (not shown) are secured to the sub-frame 38.

Figure 4:
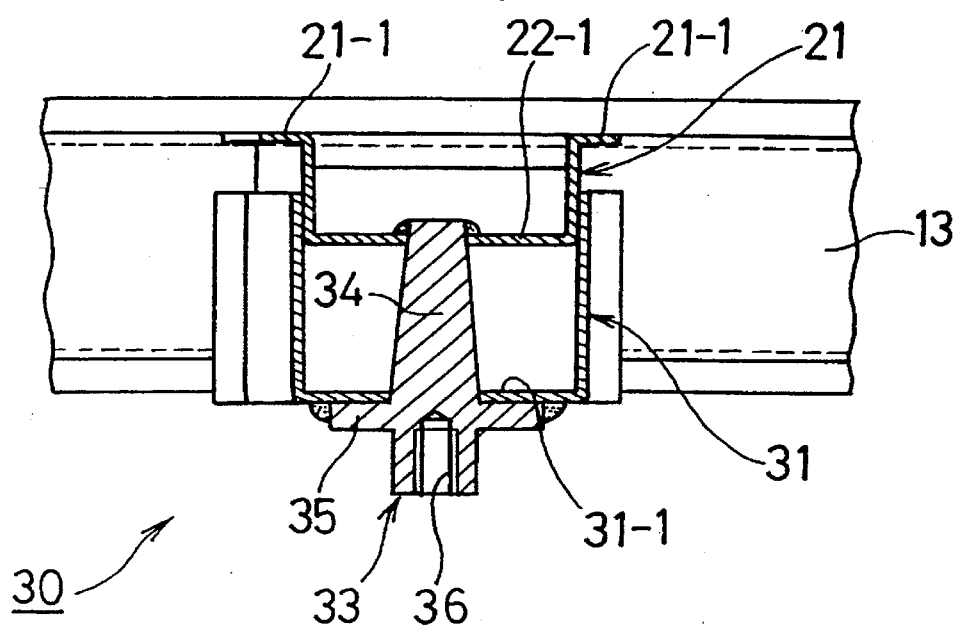
FIG. 4 is a sectional view taken along line 4—4 of FIG. 3.

FIG. 4 is a sectional view taken along line 4—4 of FIG. 3, showing a state that the bracket 31 is fixed to the rear cross member 21. The rear cross member 21 has a nearly channel cross section and its open side is faced upward of the body work. And, flanges 21-1, 21-1 are disposed at both ends of the open side of the cross member 21 in the front and back directions of the body work. Connection of the flanges 21-1, 21-1 to the bottom face of the rear floor panel 6 (see FIG. 3) forms a nearly rectangular cross section with its top closed. And the bracket 31 forms a channel with its top open. With the open side faced upward of the body work, the open end is positioned to cover both wails of the rear cross member 21 and fixed to form a nearly rectangular cross section.

Figure 5:
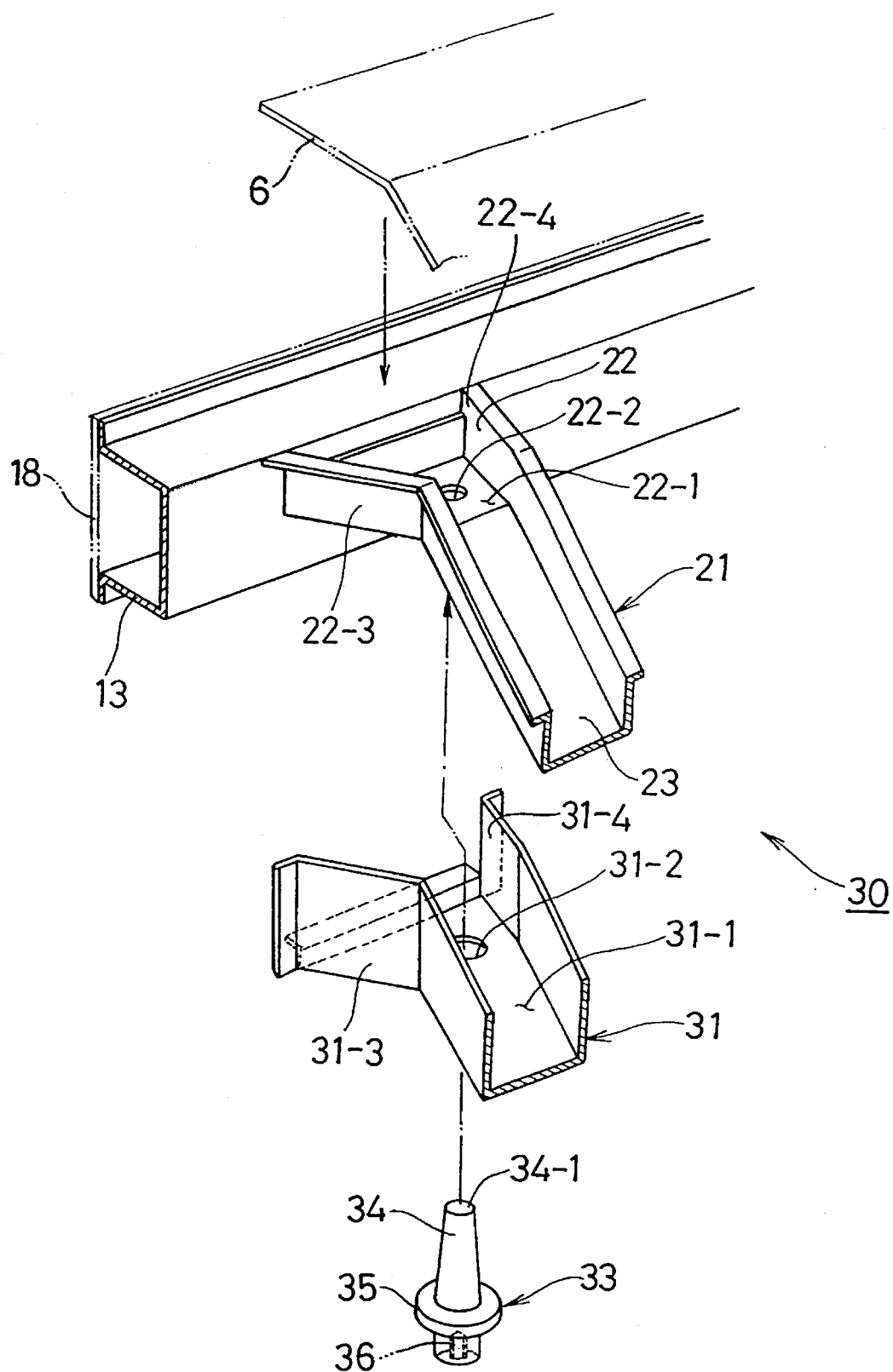
FIG. 5 is a function explanatory view of the sub-frame mounting section according to the invention.

Now, one embodiment of mounting the sub-frame mounting part 30 having the above structure will be described with reference to FIG. 5. FIG. 5 is an explanatory exploded perspective view showing a mounting procedure of the sub-frame mounting section according to the first embodiment of the invention.

First, the rear cross member 21, the bracket 31 and the nut member 33 are separately produced. The upper horizontal section 22 of the rear cross member 21 is wider in the breadth direction than the inclined section, and the bracket 31 also has the same shape. And, holes 22-2, 31-2, through which the base 34 of the nut member 33 is inserted, are formed in the bottom plate 22-1 of the upper horizontal section 22 and the bottom plate 31-1 of the bracket 31.

Then, the rear cross member 21 is mounted between the rear frames 13, 13 (FIG. 5 shows the right side only), and the end of a widened section 22-3 at the front in the front and back directions of the body work at the end of the upper horizontal section 22 and the end of a section 22-4 having the back wail expanded are connected by welding or the like to the back face (inside of the body work) of the rear frame 13. And, the bracket 31 is fitted to cover the side walls from below the upper horizontal section 22, and the bracket 13 is fixed to the rear frame 13 and the upper horizontal section 22. The bracket 31 has its front side determined to be an expanded section 31-3 and its back wall determined to be extended section 31-4 toward the rear frame 13, and is designed to cover the end of the cross member to fit it from outside. And, the base 34 of the nut member 33 is inserted from below to pass through the holes 22-2, 31-2 of the bottom plate 22-1 of the upper horizontal section 22 and the bottom plate 31-1 of the bracket 31, and the top end 34-1 of the base and the flange 33 are fixed to the bottom plate 22-1 and the bottom face of the bottom plate 31-1 respectively by welding or the like.

Finally, the rear floor panel 6 (indicated by a chain line) is placed on each top face of the rear frame 13 and the rear cross member 21 and connected, thus completing the fitting of the sub-frame mounting part 30. Then, as shown in FIG. 3, the sub-frame 38 to which the suspensions and others are fitted is secured by threading the bolt 39 into the screw hole 36 of the nut member 33.

The attachment of the nut member 33 can be determined arbitrarily by changing the locations of the holes 22-2, 31-2 within a range that the bracket 31 is mounted in the breadth direction of the body work (the right and left directions in FIG. 3). And, since the rear frame 21 and the bracket 32 which is fitted to the lower part of the rear frame 21 have their fitting ends widened in the front and back directions against the rear frame 13, the bottom plates 22-1, 31-1 are made wide in the front and back directions, and the locations of the holes 22-2, 31-2 can be changed in the front and back directions.

The above procedure for attaching the sub-frame mounting part 30 has been described to facilitate understanding of the structure according to the first embodiment, and it is to be understood that the procedure can be made in an arbitrary procedure. As to the sub-frame mounting part 30, only the right side of the car has been described in the drawings. But, the left side has the same structure and mounted in the same procedure, so that its description has been omitted.

In the above first embodiment, the joint section of the rear frame 13 and the rear cross member 21 is reinforced by means of the bracket 31, a box-shaped structure is formed by the rear arm 13, the rear cross member 21 and the bracket, and the nut member 33 is vertically inserted and connected through the structure, so that a load which is applied to the nut member 33 is supported by the box-shaped structure having high rigidity. Thus, the joint section of the rear frame 13 and the rear cross member 21 is provided with greater rigidity.

Now, the second embodiment of the sub-frame mounting structure of the invention will be described with reference to FIG. 6 and FIG. 7. In this embodiment, the same components as those used in the first embodiment will be given the same reference numerals and their description will be omitted.

Figure 6:
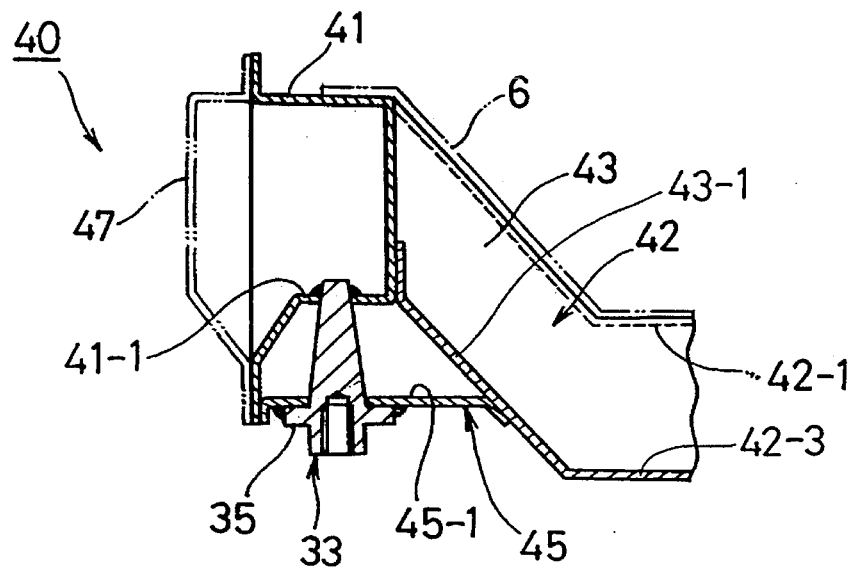
FIG. 6 is an enlarged sectional view of the sub-frame fixing section according to a second embodiment of the invention.

FIG. 6 is a sectional view of the sub-frame mounting section according to the second embodiment of the invention. A sub-frame fixing section 40 of this embodiment consists of a rear frame 41 (side member), a rear cross member 42 (cross member), the rear floor panel 6 (indicated by a chain line) which is disposed on the rear frame 41 and the rear cross member 42, a bracket 45, and the nut member 33.

The rear frame 41 forms a channel with its open side faced outside. With the open side faced outside of the body work, the open end is connected to an outside panel 47 to form a nearly rectangular box-shaped cross section. In the embodiment, the outside panel 47 has an externally bulged shape. The rear cross member 42 is connected to the back face of the rear frame 41, a front wall 42-2 at the end of the rear cross member 42 is expanded forward in the same way as in the previous embodiment as shown in FIG. 7, and a bottom plate 42-3 of the rear cross member 42 has an inclined section 43 whose end is obliquely extended downward and inward.

The rear cross member 42 forms a channel with its top side open, this open side is faced upward of the body work, and flanges 42-1, 42-1 are formed on the front and back sides of the open side ends. And, connection of the flanges 42-1, 42-1 to the bottom face of the rear floor panel 6 forms a rectangular box-shaped cross section.

The bracket 45 is disposed at the joint section of the rear frame 41 and the rear cross member 42, and fixed to them by spot welding. The bracket 45, which connects the lower part of the rear frame 41 and a bottom plate 43-1 of the inclined section 43, is joined to the bottom side of the rear frame 41. Between the rear frame 41 and the bracket 45, the nut member 33 is inserted in the vertical direction of the body work to connect and fix the top end of the nut member 33 to a bottom plate 41-1 of the rear frame 4 by welding or the like, and the flange 35 to a bottom plate 45-1 of the bracket 45 by welding or the like.

Figure 7:
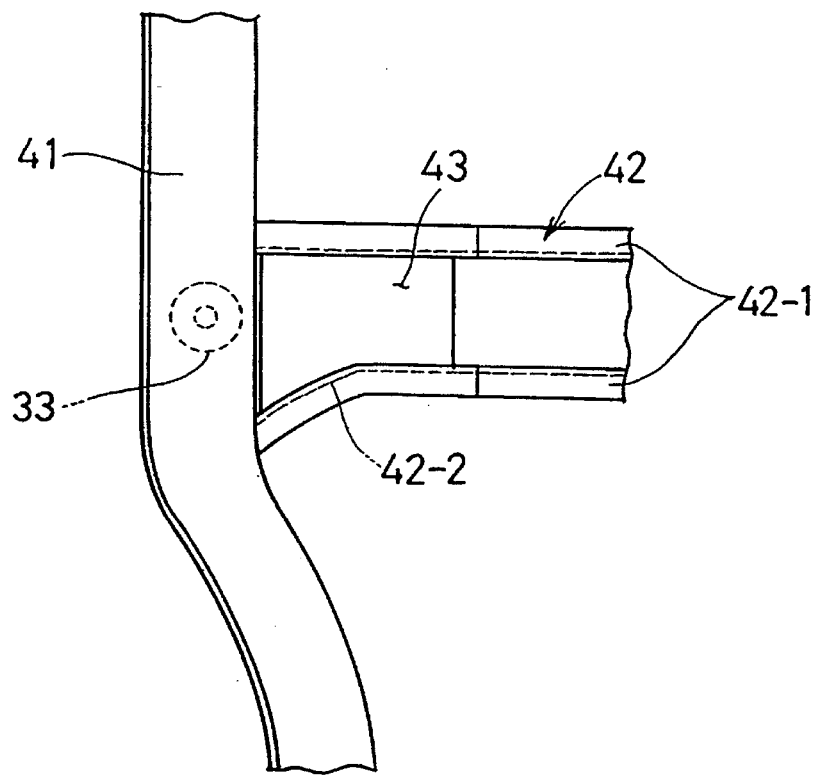
FIG. 7 is a plan view of the sub-frame mounting section according to the second embodiment of the invention.

FIG. 7 is a plan view of the sub-frame mounting section according to the second embodiment of the invention, showing that the nut member 33 is connected at the joint section of the rear frame 41 and the rear cross member 42. In this drawing, the lower side of the rear frame 41 is the front side of the car.

In the above second embodiment, the joint section of the rear frame 41 and the rear cross member 42 is reinforced by the bracket 45, and a box-shaped structure is formed by the rear frame 41, the rear cross member 42 and the bracket 45. The connection of the nut member 33 to the rear frame 41 which forms the upper part of the box-shaped structure prevents an unbalanced load from being applied from the nut member 33 to the rear frame 41, does not produce a bending moment, and provides a good load balance as compared with the first embodiment.

Now, the third embodiment of the sub-frame mounting structure according to this invention will be described with reference to FIG. 8 and FIG. 9. In this embodiment, the same components as those used in the first embodiment will be given the same reference numerals and their description will be omitted.

Figure 8:
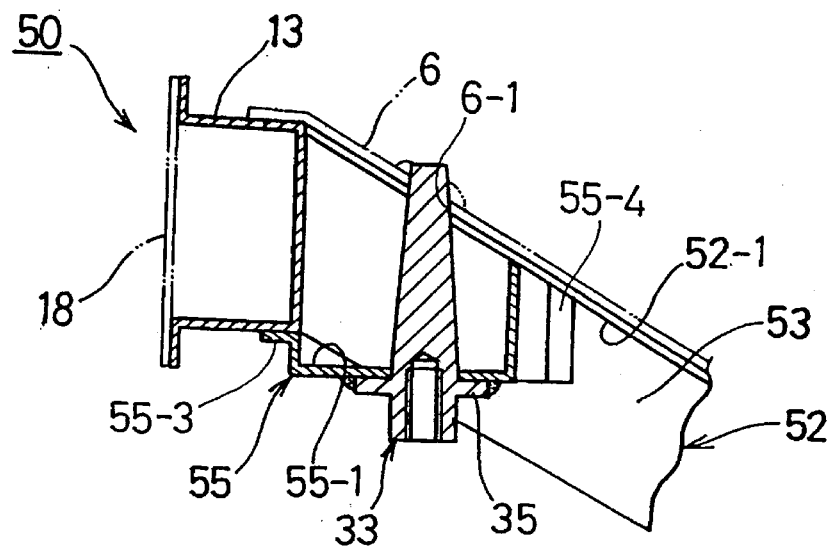
FIG. 8 is a sectional view of the sub-frame fixing section according to a third embodiment of the invention.

FIG. 8 is a sectional view of the sub-frame fixing section according to the third embodiment of the invention. In this embodiment, a sub-frame fixing section 50 consists of the rear frame 13 (side member), a rear cross member 52 (cross member), the rear floor panel 6 (indicated by a chain line) which is disposed on the rear frame 13 and the rear cross member 52, a bracket 55, and the nut member 33.

The rear cross member 52 is connected to the back face of the rear frame 13 facing the inside of the body work, and has an inclined section 53 which is obliquely extended downward and inward. The rear cross member 52 is made of a channel member whose top is open. With the open side faced upward of the body work, flanges 52-1, 52-1 are formed on both sides of the open side ends in the front and back directions. Connection of the bottom face of the rear floor panel 6 to the flanges 52-1, 52-1 forms a box-shaped structure having a nearly rectangular cross section.

The bracket 55 is disposed at the joint section of the rear frame 13 and the rear cross member 52 and fixed to them by spot welding. The bracket 55 has a flange outer end 55-3 connected to the bottom face of the rear frame 13, and a vertical flange 55-4 at the inner end connected to the front wall of the inclined section of the cross member 52. Between the rear frame 13 and the bracket 55, the nut member 33 is inserted in the vertical direction of the body work to connect and fix the top end of the nut member 33 to the rear floor panel 6 through a hole 6-1 of the panel 6 by welding or the like, and the flange 35 to the bottom face of a bottom plate 55-1 of the bracket 55 by welding or the like.

Figure 9:
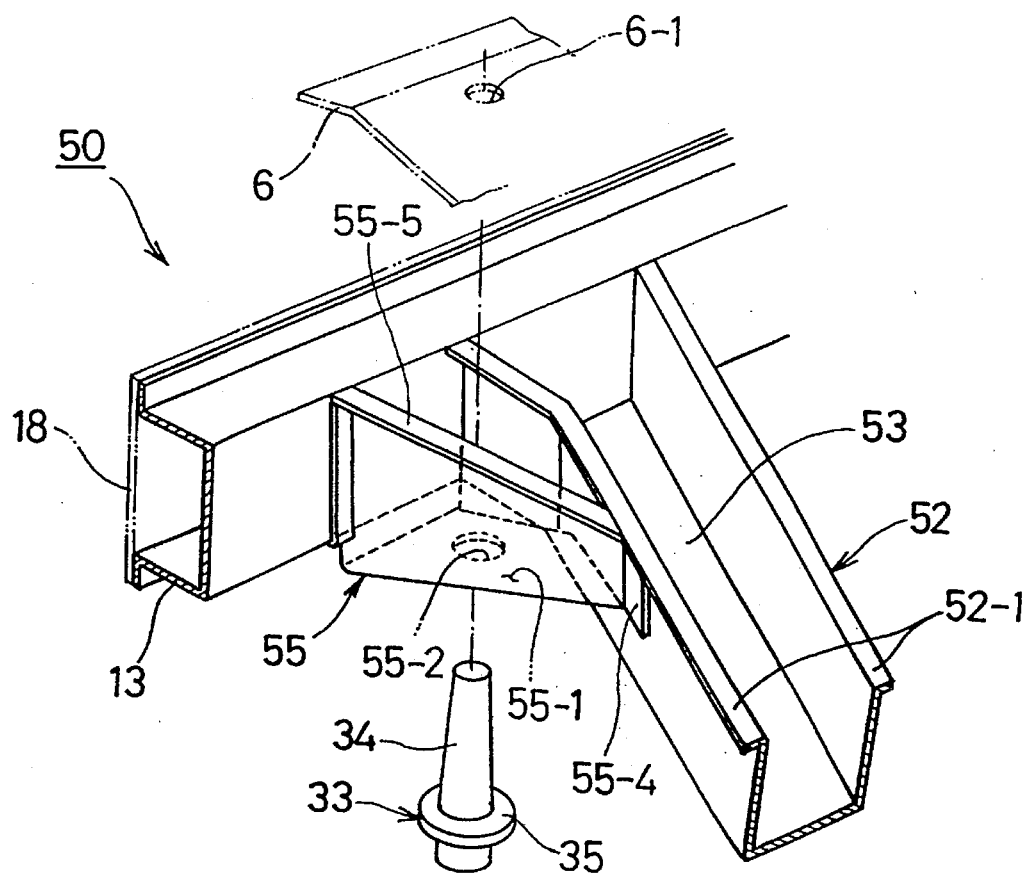
FIG. 9 is an exploded perspective view of the sub-frame mounting section according to the third embodiment of the invention.
Figure 10:
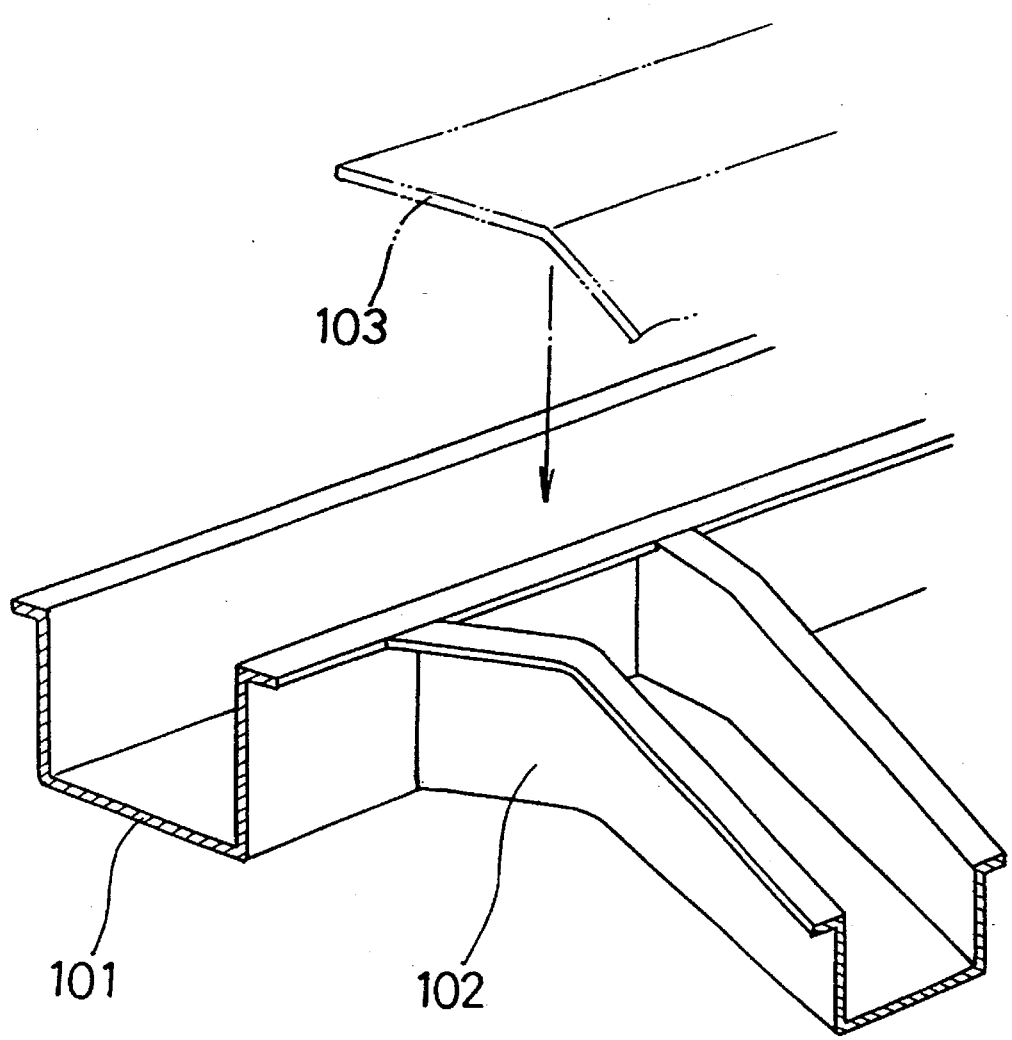
FIG. 10 is a perspective view of the essential part of a conventional car body lower structure.

FIG. 9 is an exploded perspective view of the sub-frame mounting section according to this invention, showing that the nut member 33 is connected at the joint section of the rear frame 13 and the rear cross member 52.

The rear cross member 52 forms a channel whose top is open. With the open side faced upward of the body work, the flanges 52-1, 52-1 are formed on both sides of the open side ends in the front and back directions. Connection of the bottom face of the rear floor panel 6 (indicated by a chain line) to the flanges 52-1, 52-1 forms a box-shaped structure having a nearly rectangular cross section.

The bracket 55 forms a nearly L-shaped cross section as shown in FIG. 8, and is connected to a bottom face inner end forming the back face of the rear frame 13 and to the wall on the front face of the inclined section at the end of the rear cross member 52 as described above, to form a channel cross section with its top open and a nearly triangle shape in a plan view. The open side faces upward of the body work, the top end has a flange 55-5, which is connected to the bottom face of the rear floor panel, thereby forming a box-shaped structure in the same way as described above. To insert and connect the nut member 33, a hole 55-2 and the hole 6-1 are formed in a bottom plate 55-1 of the bracket 55 and the rear floor panel 6 respectively.

In this third embodiment, the joint section of the rear frame 13 and the rear cross member 52 is reinforced by the bracket 55. And, the box-shaped structure is formed by the back face of the rear frame 13, the rear floor panel 6, the front wall (with reference to the front and back directions of the body work) of the rear cross member 52 and the bracket 55. This structure is disposed at the front side (or the side from a different view) of the rear cross member 52, so that the fitting position of the nut member 33 can be more flexibly determined as compared with the first and second embodiments.

Since the bracket 55 is connected to the front side of the rear cross member 52, the joint section of the rear frame 13 and the rear cross member 52 can have enhanced rigidity in the front and back directions of the body work.

In the first to third embodiments, the nut member 33 is a part for fixing the sub-frame 38, to which the suspensions and others are fitted, to the brackets 31, 45, 55. This nut member 33 is not limited to the above cylindrical member, but may be of any desired shapes such as a cone and a block.

The rear cross members 21, 42, 52 are disposed in the right and left directions (in the breadth direction of the body work), spanned and connected between the right and left rear frames 13, 13 and 41, 41, and includes the structure which is separated into right and left halves by the tunnel or the like in this invention.

The embodiments of this invention have been described above in detail. According to this invention, the bracket is first disposed at the joint section of the side member having a nearly rectangular cross section and the cross member, and the sub-frame, to which the suspensions and others are secured, is fitted to the bracket, so that the nut member for securing the sub-frame can be positioned as desired and have its position changed in a range that the bracket is disposed. Therefore, the sub-frame mounting position can be freely determined in a range that the bracket is disposed, and flexibility in determining the mounting position of the sub-frame in the breadth direction of the car can be enhanced. As a result, flexibility in determining the mounting position of the suspensions and others is enhanced, namely while using the same frame, the positions of the suspensions and others can be easily changed depending on different models.

Since the joint section of the side member and the cross member is reinforced by the bracket and the sub-frame is fixed to the reinforced section, the sub-frame mounted section and the joint section of each side member and the cross member can be provided with greater rigidity.

Besides, this invention disposes the bracket at the joint section of the side member and the cross member, connects the lower part of the nut member to the bracket, connects the upper part of the nut member to at least one of the side member, the cross member and the floor panel, and secures the sub-frame to the nut member. Therefore, the position of the nut member for securing the sub-frame can be freely selected and determined as described above in the range that the bracket is disposed, improving flexibility in determining the attaching position in the breadth direction of the car and readily dealing with the changes of models.

In addition to the above, the joint section of the side member and the cross member is reinforced by the bracket, the box-shaped structure is formed by the side member, the cross member, the floor panel and the bracket, the nut member is vertically inserted to fix them, and the sub-frame is secured to the nut member. Thus, the sub-frame mounted section and the joint section of each side member and the cross member can be provided with greater rigidity.

Furthermore, this invention fits one channel-shaped bracket from below the cross member to the joint section of the side member and the cross member, and vertically inserts the nut member through the bottom plate of the cross member and the bracket to connect them. Otherwise, the bracket is fitted to the back bottom face of the side member and the front wall of the cross member, and the nut member is vertically inserted through the top floor panel and the bottom plate of the bracket to connect them. Therefore, the component members are small in quantity, capable of reducing the number of parts. As a result, the sub-frame mounting structure parts can be easily assembled and produced, and the car frame can be produced advantageously. Thus, this invention has many advantageous effects in practical use.

What is claimed is:

1. In a car frame having right and left side members disposed in a longitudinal direction and a cross member extending laterally between the side members in a breadth direction, a car body work sub-frame mounting structure, comprising:

a bracket which is fitted at a joint section of one of the side members and the cross member, said bracket being secured to said one of said side members and said cross member, said bracket having a sub-frame attached thereto, said one side member, said cross member and said bracket forming an enclosed box-shaped structure, said enclosed box-shaped structure as viewed in the longitudinal direction having a cross-section with said one side member and said cross member delineating upper, left and rights sides of said cross-section and with said bracket having a bottom plate extending generally horizontally across and delineating a lower side of said cross-section, a single nut member having a screw hole at a bottom thereof for securing and supporting sold sub-frame therebelow, said single nut member extending between and connected to both said bottom plate of said bracket and a bottom plate of one of said one side member and said cross member, said single nut member being located in a selected position along said bracket.

2. A car body work sub-frame mounting structure according to claim 1, wherein said side member forms a channel which is open toward the outside, said cross member forms a channel which is open toward the upperside, and said bracket forms a channel which is fitted to said cross member from below said cross member.

3. In a car frame having right and left side members which are disposed in a longitudinal direction of a car body work and a cross member which is spanned between the side members in a breadth direction of the body work, a car body work sub-frame mounting structure, comprising:

a bracket which is fitted at a joint section of one of the side members and the cross member, said bracket being secured to said one of said side members and said cross member, said bracket having a sub-frame attached thereto, to which suspensions and other are secured, wherein a floor panel is placed on said side members, said cross member, and said bracket.

4. A car body work sub-frame mounting structure according to claim 1 or 2, wherein said single nut member extends between said bottom plate of said cross member and said bottom plate of the bracket.

5. A car body work sub-frame mounting structure according to claim 4, wherein said single nut member is vertically inserted through said bottom plate of said cross member and said bottom plate of said bracket and has pans of said nut member connected to said bottom plate of said cross member and said bottom plate of said bracket.

6. A car body work sub-frame mounting structure according to claim 5, wherein said bottom plate of said cross member and said bottom plate of said bracket extend generally horizontally to allow said nut member to be positioned in the breadth direction.

7. A car body work sub-frame mounting structure according to claim 2, wherein at said joint section of the at least one of said cross member and said bracket extends so as to be wider adjacent to said one side member.

8. A car body work sub-frame mounting structure according to claim 3, wherein a box-shaped structure having an enclosed cross section is formed by disposing said floor panel on said side member, said cross member and said bracket.

9. A car body work sub-frame mounting structure according to claim 1, wherein said bracket is attached to a lower section of said side member and is disposed below said joint between said cross member and said one side member.

10. A car body work sub-frame mounting structure according to claim 9, wherein said single nut member is vertically inserted through said bottom plate of said bracket and a bottom plate of said side member.

11. A car body work sub-frame mounting structure according to claim 1, wherein said bracket is connected to a lower section of said side member and to upwardly standing front and back walls of said cross member.

12. A car body work sub-frame mounting structure according to claim 11, wherein a floor panel is disposed over said cross member and said one side member.

13. A car body work sub-frame mounting structure according to claim 3, wherein a nut member is vertically inserted through and connected to a bottom plate of said bracket and to said floor panel disposed on said bracket and said cross member.

14. A car body work sub-frame mounting structure according to claim 13, wherein said nut member extends through only the floor panel and the bracket without penetrating the cross member or side member.

15. A car body work sub-frame mounting structure according to claim 1, wherein said one side member delineates substantially the entire left side of said cross-section and said cross member is bent and delineates substantially the entire upper and right sides of said cross-section.

16. A car body work sub-frame mounting structure according to claim 1, wherein said cross member delineates substantially the entire right side of said cross-section and said one side member has a bent portion which delineates substantially the entire upper and left sides of said cross-section.

17. A car body work sub-frame mounting structure according to claim 1, wherein said bracket has front and back upward sides forming a channel and forming front and back sides of said enclosed box-shape structure.

18. A car body work sub-frame mounting structure according to claim 15, wherein said side member forms a channel which is open toward the outside, said cross member forms a channel which is open toward the upperside, and said bracket forms a channel which is fitted to said cross member from below said cross member.

19. A car body work sub-frame mounting structure according to claim 16, wherein said one side member forms a channel which is open toward the outside, and said cross member forms a channel which is open toward the upperside.

20. A car body work sub-frame mounting structure according to claim 17, wherein said side member forms a channel which is open toward the outside, said cross member forms a channel which is open toward the upperside, and said bracket forms a channel which is fitted to said cross member from below said cross member.

21. A car body work sub-frame mounting structure according to claim 10, wherein said bottom plate of said bracket is generally flat and said bottom plate of said side member is bent downward to delineate upper and left sides of said cross-section.

* * * * *